United States Patent
Dire et al.

(10) Patent No.: US 9,417,907 B1
(45) Date of Patent: Aug. 16, 2016

(54) IMPACT MANAGEMENT OF SYSTEM TASKS

(75) Inventors: Nathan Edward Dire, Seattle, WA (US); Sydney Benjamin Melhuish, Shoreline, WA (US); Andrey Pyatkov, Seattle, WA (US); Ethan Joseph Torretta, Edmonds, WA (US)

(73) Assignee: EMC Corporation, Hopkinton, MA (US)

( * ) Notice: Subject to any disclaimer, the term of this patent is extended or adjusted under 35 U.S.C. 154(b) by 191 days.

(21) Appl. No.: 13/478,903

(22) Filed: May 23, 2012

(51) Int. Cl.
*G06F 9/46* (2006.01)
*G06F 9/48* (2006.01)

(52) U.S. Cl.
CPC ............ *G06F 9/4806* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 5,692,192 A * | 11/1997 | Sudo | 718/105 |
| 7,844,856 B1 * | 11/2010 | Ahal et al. | 714/19 |
| 2004/0230726 A1 * | 11/2004 | Blake et al. | 710/100 |
| 2007/0180116 A1 * | 8/2007 | Kim et al. | 709/226 |
| 2007/0220311 A1 * | 9/2007 | Lewin et al. | 714/6 |
| 2007/0271570 A1 * | 11/2007 | Brown et al. | 718/105 |
| 2010/0153966 A1 * | 6/2010 | Arimilli et al. | 718/105 |
| 2012/0222042 A1 * | 8/2012 | Chess et al. | 718/105 |

\* cited by examiner

*Primary Examiner* — Diem Cao
(74) *Attorney, Agent, or Firm* — Sean M. Evans; Krishnendu Gupta

(57) ABSTRACT

Embodiments are directed towards managing an impact of a plurality of system and/or maintenance tasks distributed across a plurality of nodes. At least one initiator node may provide at least one disk request to at least one disk on at least one participant node. Each disk on each participant node with a workload, such as request wait time, above a maximum threshold and/or below a minimum threshold may be determined. If a disk is determined to have a workload above a maximum threshold and/or below a minimum threshold, then an impact of respective tasks on initiator nodes that provided requests to the determined disks may be reduced and/or increased, respectively. In some embodiments, an initiator node may reduce or increase an impact of a task by reducing or increasing a number of threads executing on that initiator node for that task.

20 Claims, 10 Drawing Sheets

IMPACT MANAGEMENT OF SYSTEM TASKS

TECHNICAL FIELD

The present invention relates generally to task management and, more particularly, but not exclusively to modifying an impact of tasks operating on one node based on a workload of another node.

BACKGROUND

Today, many computing tasks are performed across distributed computing environments. Typically these environments include a plurality of nodes that may be performing a number of different tasks. These tasks may include user initiated tasks, system/maintenance tasks, and the like. Sometimes, the execution of user initiated tasks on a single node may be impacted by system/maintenance tasks executing on the same node or another node. However, it may be difficult to determine an impact of a task on one node if the task is executing on another node. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
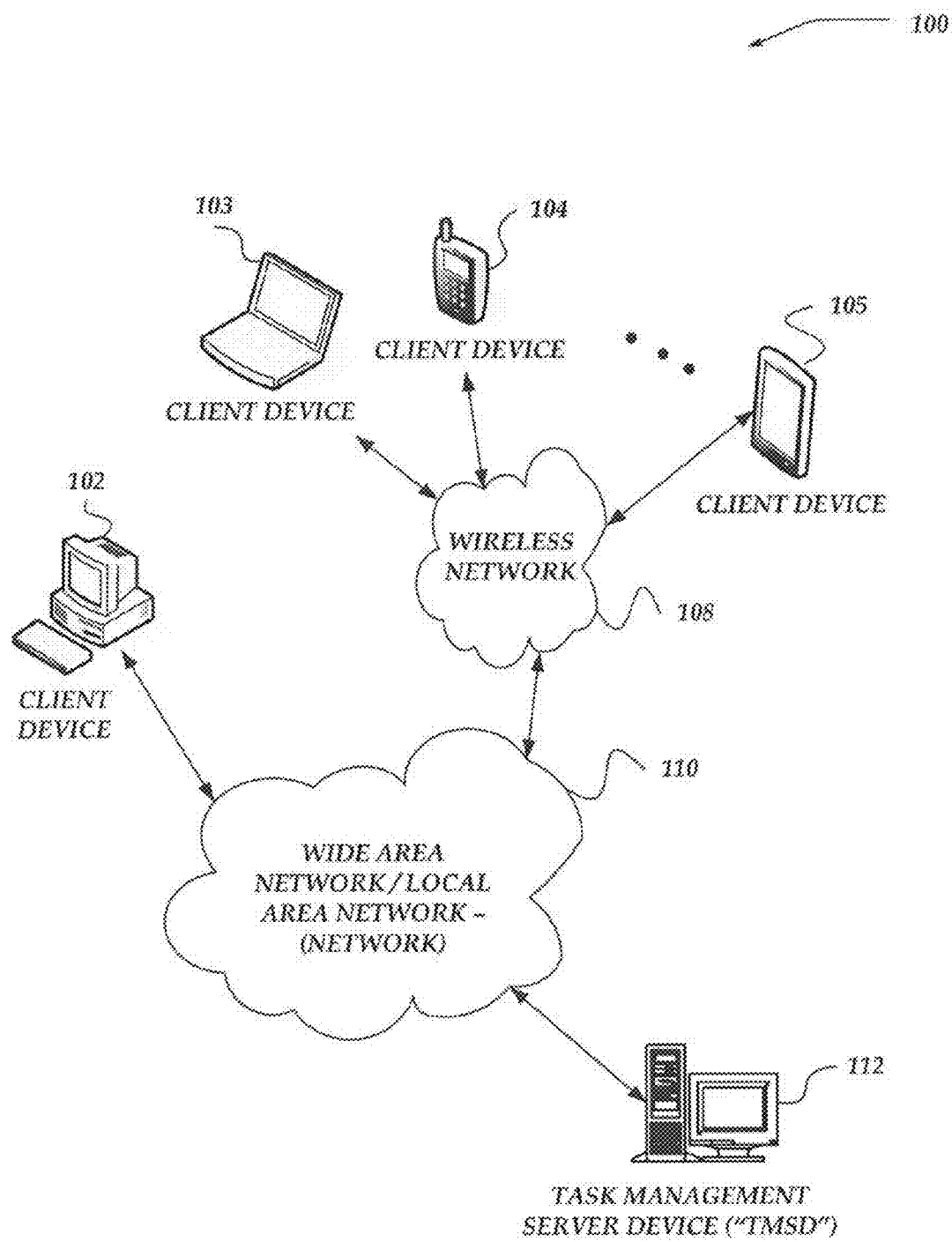
FIG. 1 illustrates a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein,, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

As used herein, the term "cluster" refers to one or more logically connected nodes. In some embodiments, each node within a cluster may communicate information about nodes within the cluster to other nodes in the cluster. In some other embodiments, a cluster may include a coordinator node to delegate actions between the nodes in the cluster, manage a status of the cluster, or the like.

As used herein, the term "initiator node" refers to a node that provides a request to a node. As used herein, the term "participant node" refers to a node that receives a request from a node. In one embodiment, a participant node may provide access to at least one storage drive device. In some embodiments, the participant node and the initiator node may be different and/or separate nodes. For example, Node A (i.e., initiator node) may provide a storage drive access request to Node B (i.e., participant node). In other embodiments, the participant node and the initiator node may be a same node. For example, Node A (i.e., initiator node) may provide a request to access a storage drive device local to Node A (i.e., participant node).

As used herein, the term "thread" refers to a portion and/or a subset of a process (e.g., a task) that can be individually scheduled for processing by a computing device. A plurality of threads of a process may share resources between the plurality of threads. In some embodiments, a thread can be fractionally increased and/or decreased. As used herein, the term "fractional thread" refers to an amount of work processed by a thread in a given amount of time that is less than a maximum possible amount of work processed by the thread for the given amount of time. In some embodiments, a fractional thread may be a thread that may be maintained in a state of readiness without producing work associated with a task.

In one embodiment, a thread can be reduced by a fractional thread by reducing an amount of processing performed by the thread for a given period of time. For example, if a thread is performing five operations per millisecond, then the thread may be fractionally reduced to perform three operations per millisecond. In another embodiment, a thread can be increased by a fractional thread by increasing an amount of processing performed by the thread for a given period of time if the thread is not performing at maximum capacity. For example, if a thread has a maximum capacity of performing 24 operations per millisecond and is performing five operations per millisecond, then the thread may be fractionally increased to perform seven operations per millisecond. In yet other embodiments, a thread performing at maximum capacity may be fractionally increased by initializing an additional thread and/or fractional thread. For example, if a thread is performing at maximum capacity, then the thread may be fractionally increased by initializing another thread (i.e., a fractional thread) that may, for example, perform 3 operations per millisecond. However, the invention is not so limited, and threads may be reduced and/or increased by other fractional threads.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing an impact of a plurality of tasks distributed across a plurality of nodes. In some embodiments, a coordinator node may distribute the plurality of tasks across the plurality of nodes (i.e., a cluster) such that at least a portion of each task may operate on one or more nodes. Tasks may include, but is not limited to, system and/or maintenance tasks. In some embodiments, a task operating on a node may include one or more whole and/or fractional threads executing on the node.

In at least one of the various embodiments, at least one initiator node may generate and provide at least one request to at least one participant node. In some embodiments, the request may be a storage drive access request (e.g., a disk access request), which may include a read operation, a write operation, or the like. In at least one of the various embodiments, an initiator node may provide the storage drive access request to one or more storage drive devices local to the node and/or provide the storage drive access request to a different node that provides access to one or more storage drive devices on the different node (i.e., participant nodes).

In some embodiments, a coordinator node may determine each storage drive device (e.g., disks) on each participant node with a workload above a maximum threshold and/or below a minimum threshold. In one embodiment, the coordinator node may utilize statistical data from each node to determine the workload. In some embodiments, the workload of a storage drive device may be based on a request wait time, a number of operations, processor utilization, and/or any combination thereof.

If a storage drive device is determined to have a workload above a maximum threshold, then an impact of respective tasks on initiator nodes that provided requests to the determined storage drive devices may be reduced. If a storage drive device is determined to have a workload below a minimum threshold, then an impact of respective tasks on initiator nodes that provided requests to the determined storage drive device may be increased. In some embodiments, an initiator node may reduce or increase an impact of a task by reducing or increasing a number of threads executing on that initiator node for that task, respectively.

In one embodiment, an impact of a task may be reduced and/or increased based on a predefined impact policy for the task. In some embodiments, the impact policy may include a minimum and/or maximum number of threads that can be executing for the task across all nodes in a cluster and/or on a single node. In other embodiments, the impact policy for a task may define rules for reducing and/or increase an amount of impact of the task, such as, for example, incremental step decreases and/or increases.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks ("LANs")/ wide area networks ("WANs")—(network) 110, wireless network 108, client devices 102-105, and Task Management Server Device ("TMSD") 112.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol ("IP") address, a phone number, Mobile Identification Number ("MIN"), an electronic serial number ("ESN"), or other device identifier. Such information may be provided in a network packet, or the like, sent between other client devices, TMSD 112, or other computing devices.

Client devices 102-105 may further be configured to include a client application that enables an end-user to log into an end-user account that may be managed by another computing device, such as TMSD 112, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN ("WLAN") networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 108 may include virtually any wireless communication mechanism by which information may travel between client devices 103-105 and another computing device, network, and the like.

Network 110 is configured to couple network devices with other computing devices, including, TMSD 112, client device 102, and client devices 103-105 through wireless network 108. Network 110 is enabled to employ any form of computer readable media for communicating information from one electronic device to another. Also, network 110 can include the Internet in addition to local area networks ("LANs"), wide area networks ("WANs"), direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol ("IP"). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

TMSD 112 includes virtually any network device usable to distribute a plurality of tasks across a plurality of nodes. TMSD 112 may perform an impact analysis on the plurality of nodes to determine an impact of each of the plurality of tasks on each node. In some embodiments, TMSD 112 may determine each storage drive device (e.g., each disk) on one or more participant nodes with a workload above a maximum threshold and/or below a minimum threshold, where participant nodes receive storage drive access requests from initiator nodes. TMSD 112 may employ one or more initiator nodes to dynamically reduce and/or increase an impact of respective tasks on the initiator nodes that provided requests to the determined storage drive devices. In at least one of the various embodiments, TMSD 112 may be configured to receive data from client devices 102-105. TMSD 112 may employ processes such as described below in conjunction with FIGS. 4-8 to perform at least some of its actions.

Devices that may be arranged to operate as TMSD 112 include various network devices, including, but not limited to personal computers, desktop computers, multiprocessor systems, microprocessor-based or programmable consumer electronics, network PCs, server devices, network appliances, and the like.

Although FIG. 1 illustrates TMSD 112 as a single computing device, the invention is not so limited. For example, one or more functions of the TMSD 112 may be distributed across one or more distinct network devices. In some embodiments, TMSD 112 may include one or more nodes, one or more clusters, and/or a centralized data store.

Moreover, TMSD 112 is not limited to a particular configuration. Thus, in one embodiment, TMSD 112 may contain a plurality of network devices. Similarly, in another embodiment, TMSD 112 may contain a plurality of network devices that operate using a master/slave approach, where one of the plurality of network devices of TMSD 112 operates to manage and/or otherwise coordinate operations of the other network devices. In other embodiments, the TMSD 112 may operate as a plurality of network devices within a cluster architecture, a peer-to-peer architecture, and/or a cloud architecture. Thus, the invention is not to be construed as being limited to a single environment, and other configurations, and architectures are also envisaged.

Illustrative Client Device

Figure 2:
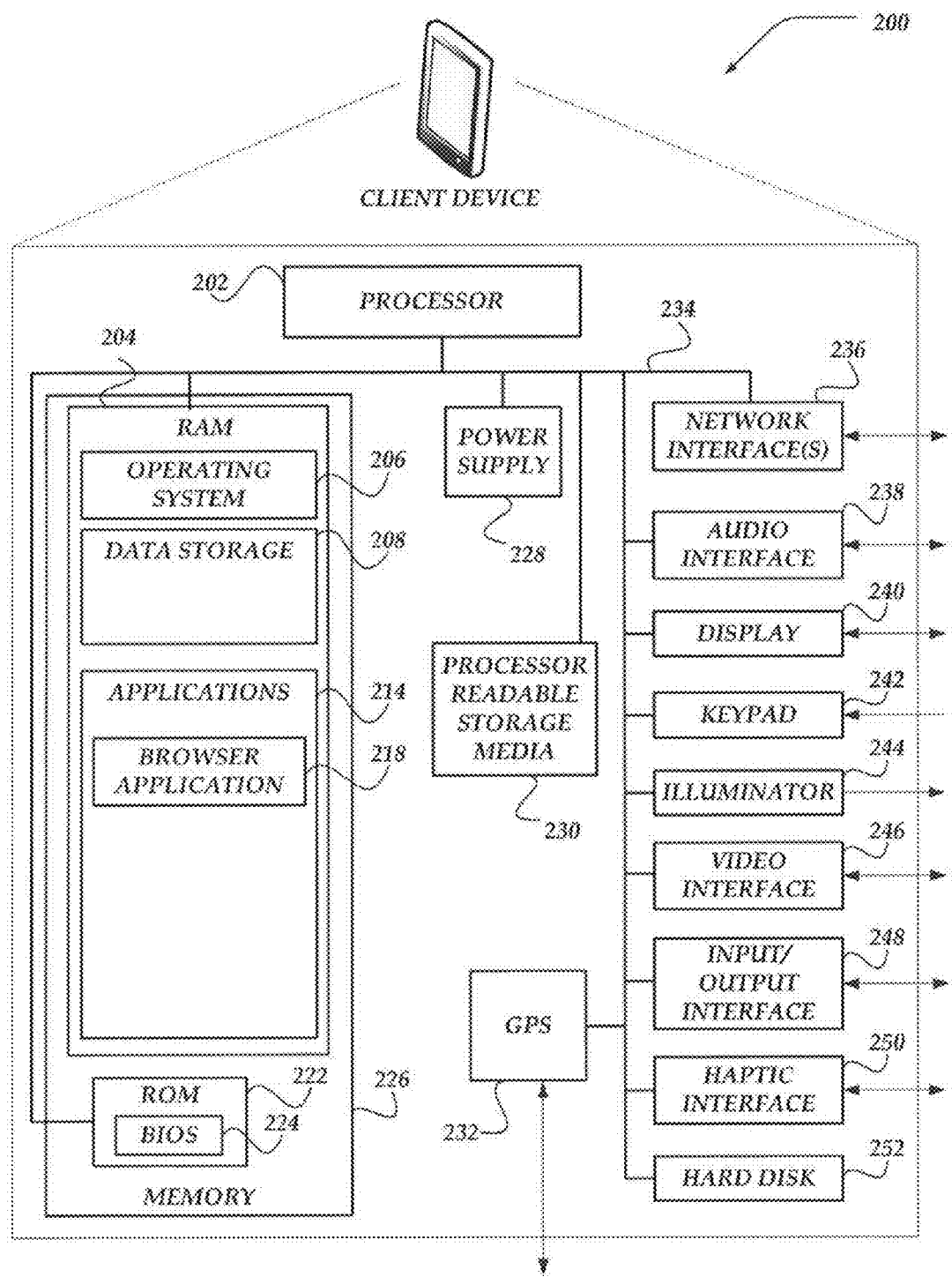
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via bus 234. In some embodiments, processor 202 may include one or more central processing units ("CPU"). Client device 200 also includes a power supply 228, one or more network interfaces 236, an audio interface 238, a display 240, a keypad 242, an illuminator 244, a video interface 246, an input/output interface 248, a haptic interface 250, and a hard disk 252, and a global positioning system ("GPS") transceiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol ("UDP"), transmission-control protocol/Internet protocol ("TCP/IP"), short message service ("SMS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Memory 226 illustrates an example of computer readable storage media (devices) for storage of information such as computer readable instructions, data structures, program modules or other data. Memory 226 stores a basic input/output system ("BIOS") 224 for controlling low-level operation of client device 200. The memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

Memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of client device 200, including, but not limited to processor readable storage media 230, hard disk 252, or other computer readable storage medias (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 230 may also be referred to as computer readable storage device.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218.

Browser 218 may include virtually any application configured to receive and display graphics, text, multimedia, and the like, employing virtually any web based language. In one embodiment, browser 218 may be enabled to employ HDML, WML, WMLScript, JavaScript, SGML, HTML, XML, or the like, to display and send messages. However, any of a variety of other web-based languages may be employed. In one embodiment, browser 218 may enable a user of client device 200 to communicate with another network device, such as TMSD 112 of FIG. 1.

Illustrative Network Device

Figure 3:
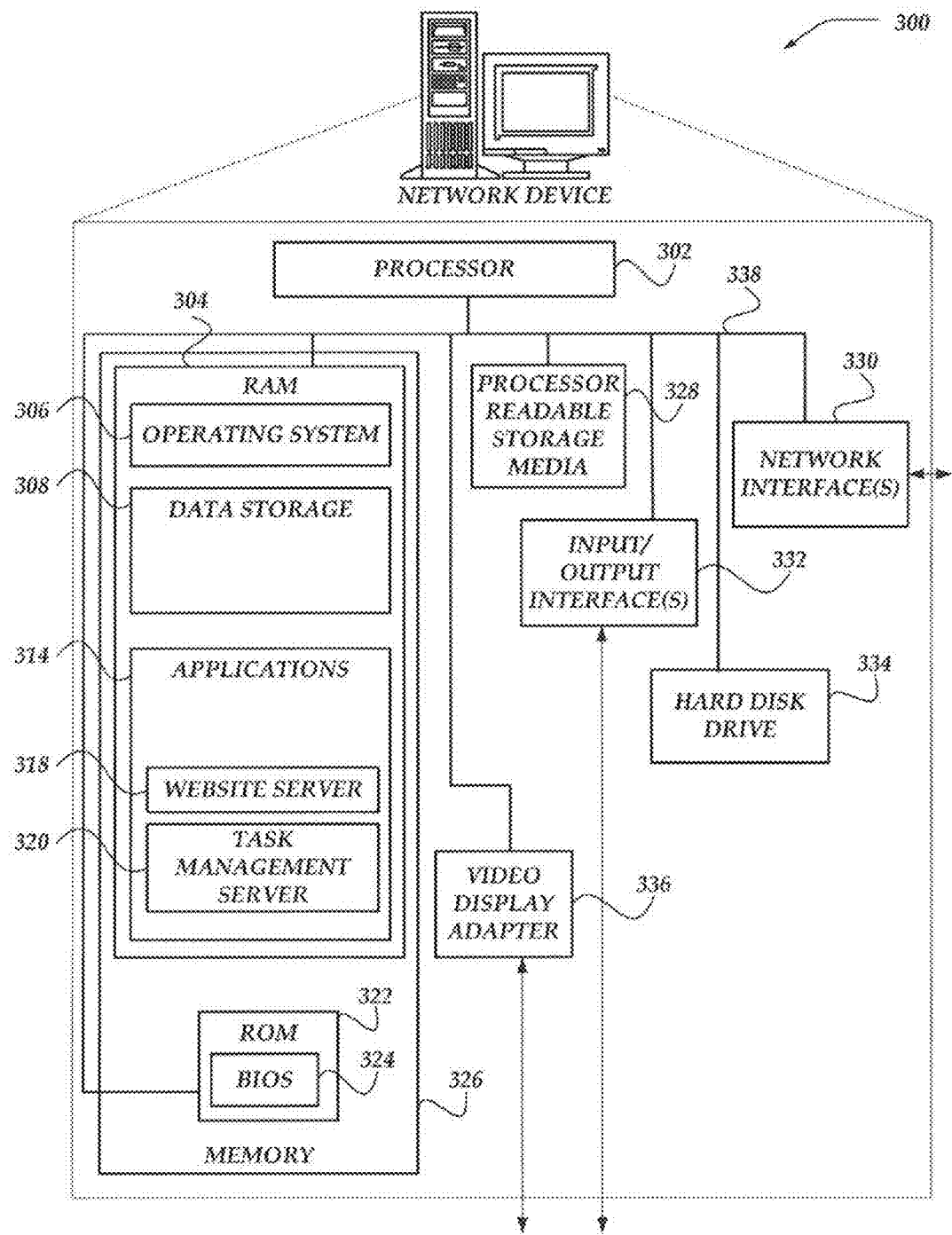
FIG. 3 illustrates an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example TMSD 112 of FIG. 1. In some embodiments, network device 300 may be configured as one or more nodes in a cluster of nodes.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system ("BIOS") 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300

Data storage 308 may include a database, text, spreadsheet, folder, file, or the like, that may be configured to maintain and store user account identifiers, user profiles, email addresses, IM addresses, and/or other network addresses; or the like.

Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Website server 318 and Task Management Server ("TMS") 320 may also be included as application programs within applications 314.

Website server 318 may represents any of a variety of information and services that are configured to provide content, including messages, over a network to another computing device. Thus, website server 318 can include, for example, a web server, a File Transfer Protocol ("FTP") server, a database server, a content server, or the like. Website server 318 may provide the content including messages over the network using any of a variety of formats including, but not limited to WAP, HDML, WML, SGML, HTML, XML, Compact HTML ("cHTML"), Extensible HTML ("xHTML"), or the like.

TMS 320 may be configured to manage a plurality of tasks that are distributed across a plurality of nodes. TMS 320 may perform an impact analysis on the plurality of nudes to determine an impact of each of the plurality of tasks on each node. In some embodiments, TMS 320 may determine each storage drive device (e.g., disks) on one or more participant nodes with a workload above a maximum threshold and/or below a minimum threshold, where participant nodes receive storage drive access requests from initiator nodes. TMS 320 may employ one or more initiator nodes to dynamically reduce and/or increase an impact of respective tasks on the initiator nodes that provided requests to participant nodes that provided access to the determined storage drive devices. In some embodiments, TMS 320 may be configured to dynamically reduce or increase an impact of a task on a node by reducing or increasing a number of threads executing on that node for the task. In any event, TMS 320 may employ processes, or parts of processes, similar to those described in conjunction with FIGS. 4-8 to perform at some of its actions.

General Operation

Figure 4:
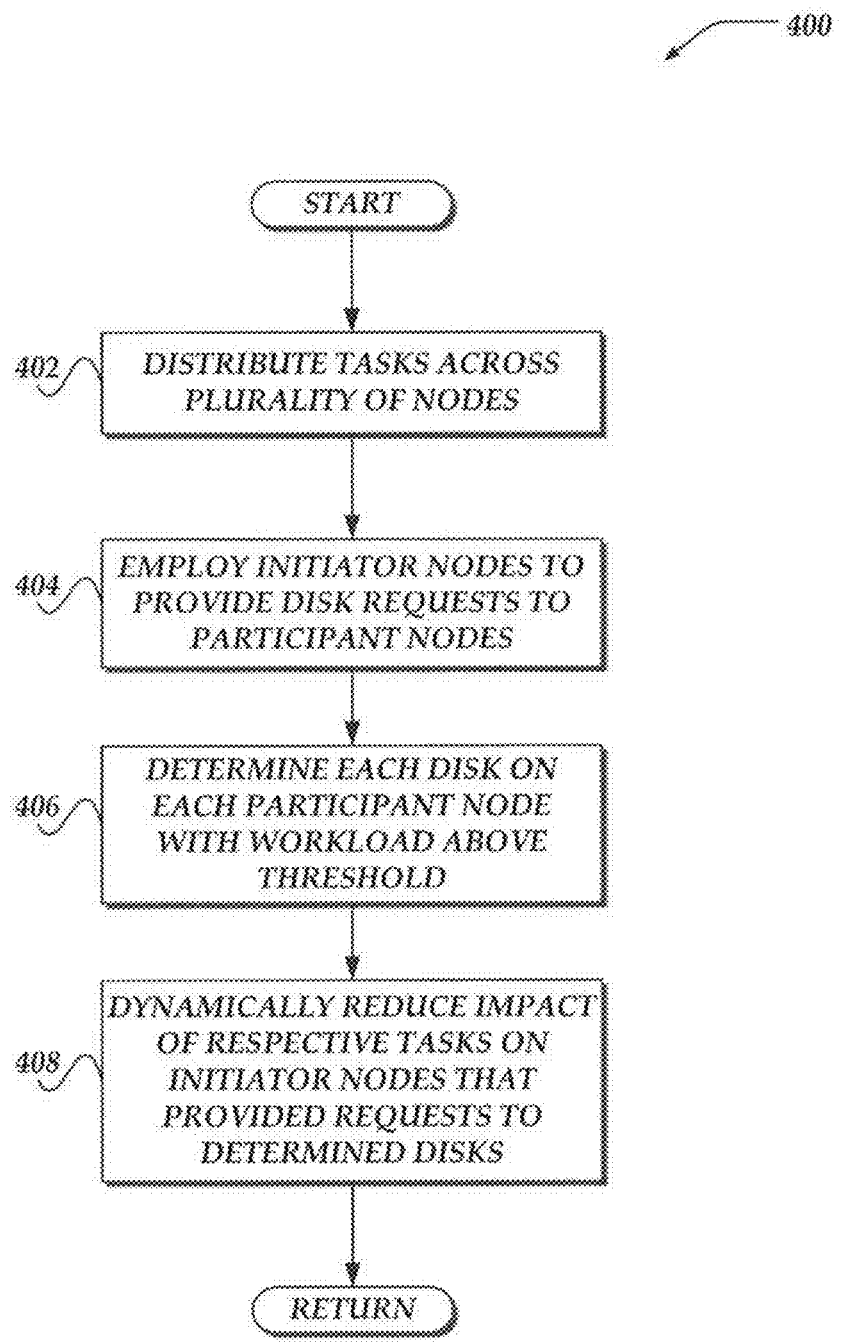
FIG. 4 illustrates a logical flow diagram generally showing one embodiment of an overview process for dynamically reducing an impact of tasks operating on an initiator node based on a workload of a storage drive device on a participant node.

The operation of certain aspects of the invention will now be described with respect to FIGS. 4-8. FIG. 4 illustrates a logical flow diagram generally showing one embodiment of an overview process for dynamically reducing an impact of tasks operating on an initiator node based on a workload of a storage drive device on a participant node. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

Process 400 begins, after a start block, at block 402, where a plurality of tasks may be distributed across a plurality of nodes, such as a cluster of nodes. In one embodiment, distributing tasks across a plurality of nodes may include providing at least one thread for at least one received task for processing on at least one of the plurality of nodes. In some embodiments, the plurality of tasks may include, but are not limited to, system tasks, maintenance tasks, and the like. In at least one of the various embodiments, a task operating on a node may include one or more whole threads and/or fractional threads executing on the node. For example, a node may employ four threads for Task A and one and a half threads for Task B. However, this example is not to be construed as limiting or exhaustive, but rather other numbers of nodes, tasks, tasks per node, and/or threads per task per node may be employed.

In one embodiment, a node among the plurality of nodes and/or a separate node may be identified as a coordinator node. In some embodiments, the coordinator node may be identified by self election, node voting, a pre-designated coordinator node, or the like. The coordinator node may distribute the plurality of tasks across the plurality of nodes such that at least a portion of each task may operate on one or more nodes. In some embodiments, tasks may be initially distributed randomly across the plurality of nodes. In at least one of various embodiments, the coordinator node may perform an impact analysis of tasks operating across the plurality of nodes to distribute new tasks and/or dynamically modify an impact of current tasks, which is described in more detail below in conjunction with blocks 406 and 408, and with FIGS. 6, 7, and 8. In some embodiments, the coordinator node may perform the impact analysis randomly, at predetermined times, at periodic time intervals, or the like, such as, for example, every 20 seconds. In one embodiment, a task on a node may be modified one time per impact analysis.

In any event, process 400 proceeds to block 404, which is described in more detail below in conjunction with FIG. 5. Briefly, however, at block 404, at least one initiator node may generate and provide at least one request to at least one participant node. In one embodiment, generating and providing the at least one request may include employing one of the plurality of nodes that is currently processing the at least one thread as an initiator node that is operative to provide at least one storage drive access request to at least another of the plurality of nodes that is separately employed as a participant node that provides access to at least one storage drive device. Initiator nodes may provide requests to participant nodes randomly, at periodic time intervals, or the like. In some embodiments, the request may be a disk request, which may include read operations, write operations, or the like. As used herein, the term "disk" may refer to virtually any storage drive device, which may include, for example, but is not limited to hard disk drives, flash drives, solid state memory devices, and the like. In at least one of the various embodiments, an initiator node may provide the disk request to one or more disks local to the node and/or to one or more disks on a different node (i.e., participant nodes).

Continuing to block 406, each disk on each participant node with a workload above a maximum threshold may be determined. As used herein, each disk with a workload above a maximum threshold may be referred to as a "hot disk." One embodiment of determining each disk on each participant node with a workload above a maximum threshold is described in more detail below in conjunction with FIG. 6.

In at least one of the various embodiments, a coordinator node may determine a workload of each disk on each node within the plurality of nodes that is above a predefined maximum threshold. In one embodiment, determining the workload of each disk may be part of an impact analysis, as described above. In some embodiments, the workload of a disk may be based on a request wait time, a number of operations, processor utilization, request completion time, and/or any combination thereof.

Thus, in some embodiments, the coordinator node may determine each disk that includes a request wait time above a maximum threshold. In one embodiment, the request wait time may be based on a time requests wait in a queue of a disk before the disk processes the requests, such as, for example, an average time in queue, a maximum time in queue, a minimum time in queue, a mode time in queue, and/or a median time in queue. In other embodiments, the coordinator node may determine each disk that, includes a total number of operations for a given period of time that is above a maximum threshold. In yet other embodiments, the coordinator node may determine each disk on a node where that node's processor utilization is above a maximum threshold. In some other embodiments, the coordinator node may determine each disk that includes a request completion time above a maximum threshold. In one such embodiment, the workload may be based on an amount of time a disk takes, and/or is expected to take, to complete one or more requests.

In some other embodiments, which are described in more detail below in conjunction with FIG. 7, a coordinator node may determine each disk on each participant node with a workload below a predefined minimum threshold. As used herein, each disk with a workload below a minimum threshold may be referred to as a "cold disk." Briefly, in some embodiments, the coordinator node may determine each disk that includes a request wait time below a minimum threshold. In other embodiments, the coordinator node may determine each disk that includes a total number of operations for a given period of time that is below a minimum threshold.

As noted above, the coordinator node may utilize statistical data from each node to determine a workload of each disk on each node. In one embodiment, the coordinator node may query a stats monitor of each node to obtain the statistical data. In such an embodiment, each node may provide statistical data about each of its disks to the coordinator node. The coordinator node may utilize the statistical data to determine which disks have a current workload above a maximum threshold and/or below a minimum threshold. In some other embodiments, each node may individually determine if each of its disks have a workload above the maximum threshold and/or below a minimum threshold.

In at least one of various embodiments, each node may employ a stats monitor to collect and/or store statistical data about that node. In one embodiment, the stats monitor for a node may collect and/or store statistical data about each physical drive on that node. For example, the stats monitor for node A may collect and/or store a total number of read operations, a total number of write operations, a total number of read bytes, a total number of written bytes, a wait time of requests in queue, or the like, for each disk on node A. In some embodiments, the stats monitor may include a mapping between a request, an initiator node that provided the request, a task associated with the request, a disk that received the request, the corresponding statistical data of the request, and the like. In one embodiment, this mapping may be implemented using a request tag identifier that uniquely identifies a request. In one embodiment, the stats monitor may be enabled to discard old request tag identifiers, maintain specific request tag identifiers (e.g., for a predetermined amount of time), or the like.

In one embodiment, the stats monitor may collect and/or store statistical data for predetermined periods of time, such as, for example, five second intervals. In some embodiments, the stats monitor may discard old statistical data when new statistical data is collected and/or stored. In some other embodiments, the coordinator node may collect and/or store the statistical data about each disk on each node.

In any event, process 400 continues next at block 408, where an impact of respective tasks on initiator nodes that provided requests to the determined disks (i.e., hot disks) may be reduced. Embodiments of block 408 are described in more detail below in conjunction with FIG. 8. Briefly, however, in one embodiment, each task and corresponding initiator node that provided a request to a hot disk may be identified. The identified initiator nodes may be employed, in some embodiments, to reduce an impact of the identified task operating on a respective identified initiator node.

In some other embodiments, as described above, each disk on each participant node with a workload below a minimum threshold may be determined (i.e., cold disks). In such an embodiment, each task and corresponding initiator node that provided a request to a cold disk may be identified. The identified initiator nodes may be employed, in some embodiments, to increase an impact of the identified task operating on a respective identified initiator node.

In one embodiment, an identified initiator node may reduce or increase an impact of a task by reducing or increasing a number of threads executing on the identified initiator node for that task, respectively. A number of threads for a task may be reduced or increased by whole threads and/or fractional threads. Reducing a number of threads may include terminating a currently executing thread, putting a thread to sleep for a predetermined time, putting a thread to sleep until the number of threads is increased, or the like. In one embodiment, the identified initiator node may terminate, end, sleep, and/or fractionally reduce a thread that initiated a request that was provided to a hot disk. In another embodiment, an identified initiator node may reduce an impact of a task by limiting a number of requests made from the identified initiator node to a hot disk. However, the invention is not so limited and other methods of reducing impact may also be employed. In one non-limiting, non-exhaustive example, parameters to calls into the kernel (e.g., from a task being processed by the identified initiator node to a kernel of the identified initiator node) may be modified, such that, for example, the kernel may initiate fewer I/O requests at a time, or the like.

In some embodiments, an impact of each task associated with a hot disk or cold disk may be reduced or increased proportionally, by a percentage, by different amounts, by predefined amounts, to a predetermined number of threads, or the like. In one embodiment, an amount of impact reduction or increase may be based on an amount a workload exceeds a threshold. For example, if a request wait time for a disk exceeds a maximum threshold by 20 percent, then an identified initiator node may reduce an impact of an associated task by 20 percent.

In some embodiments, an impact of a task may be reduced and/or increased based on a predefined impact policy for the task. In some embodiments, the impact policy for a task may indicate an amount of impact the task can impose on the cluster of nodes and/or a single node. In one non-limiting, non-exhaustive example, a high impact task may be able to utilize more threads than a low impact task. In one embodiment, the impact policy may include a minimum and/or maximum number of threads that can be executing for the task across all nodes in the cluster. In another embodiment, the impact policy may include a minimum and/or maximum number of threads that can be executing on a single node. In at least one of the various embodiments, the impact policy for a task may be configurable and/or schedulable, such as by an administrator, user, or the like. In other embodiments, the impact policy for a task may define an impact reduction amount and/or an impact increase amount for the task. For example, an identified initiator node may reduce or increase a number of threads for Task A by one thread. As a result, a task on the identified initiator node may be incrementally decreased and/or increased.

After block 408, process 400 returns to a calling process to perform other actions.

Figure 5:
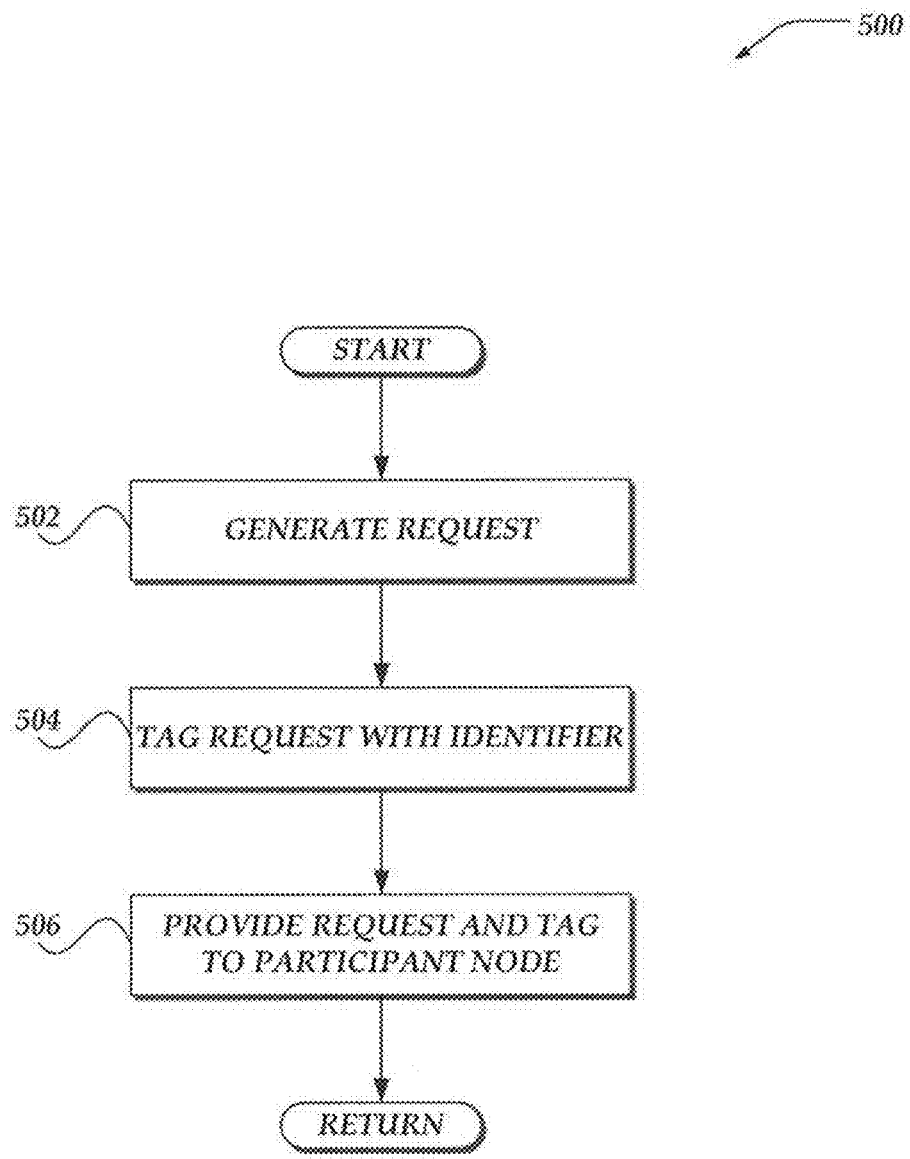
FIG. 5 illustrates a logical flow diagram generally showing one embodiment of a process for an initiator node to generate and provide a request to a participant node.

FIG. 5 illustrates a logical flow diagram generally showing one embodiment of a process for an initiator node to generate and provide a request to a participant node. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at block 502, where a request is generated. In at least one of the various embodiments, a task and/or associated thread on an initiator node may generate the request. In some embodiments, the request may be an input/output request, such as, but not limited to a disk request (e.g., a read request and/or write request). In one embodiment, the disk request may be to a disk on a same node and/or a different node than the node generating the request.

Process 500 proceeds to block 504, where the request may be tagged with an identifier. In some embodiments, tagging the identifier to the request may include attaching the identifier to the request. In some other embodiments, a thread that is handling the request may also be tagged with the identifier to enable the initiator node to identify which tread initiated the request. In one embodiment, the initiator node may generate the identifier. In another embodiment, a coordinator node may generate the identifier and may provide the identifier to initiator nodes for use with subsequent requests from the initiator nodes.

In at least one of the various embodiments, the identifier may uniquely identify the request. In one embodiment, the identifier may include a protocol and unique key to uniquely identify the request within that protocol. In at least one of the various embodiments, the protocol may identify the initiator node generating the request. In one non-limiting, non-exhaustive example, the protocol may be network file system ("NFS") and an IP address of the initiator node. In another non-limiting, non-exhaustive example, the protocol may identify a task and the initiator node. However, these examples are not to be construed as limiting, and other identifier may be utilized to identify a request. In one embodiment, the identifier may be five bytes; however, other sizes of identifier may also be employed.

Continuing to block 506, the request and tagged identifier may be provided to at least one participant node. In some embodiments, each participant node may store each received tag. In one embodiment, the participant node may also store statistical data associated with the tag (i.e., request), such as, but not limited to, number of read operations, number of write operations, number of bytes read, number of bytes written, or the like, for the corresponding request. In such an embodiment, a stats monitor for the node may collect and/or store the statistical data, such as described above in conjunction with block 406 of FIG. 4.

After block 506, process 500 returns to a calling process to perform other actions.

Figure 6:
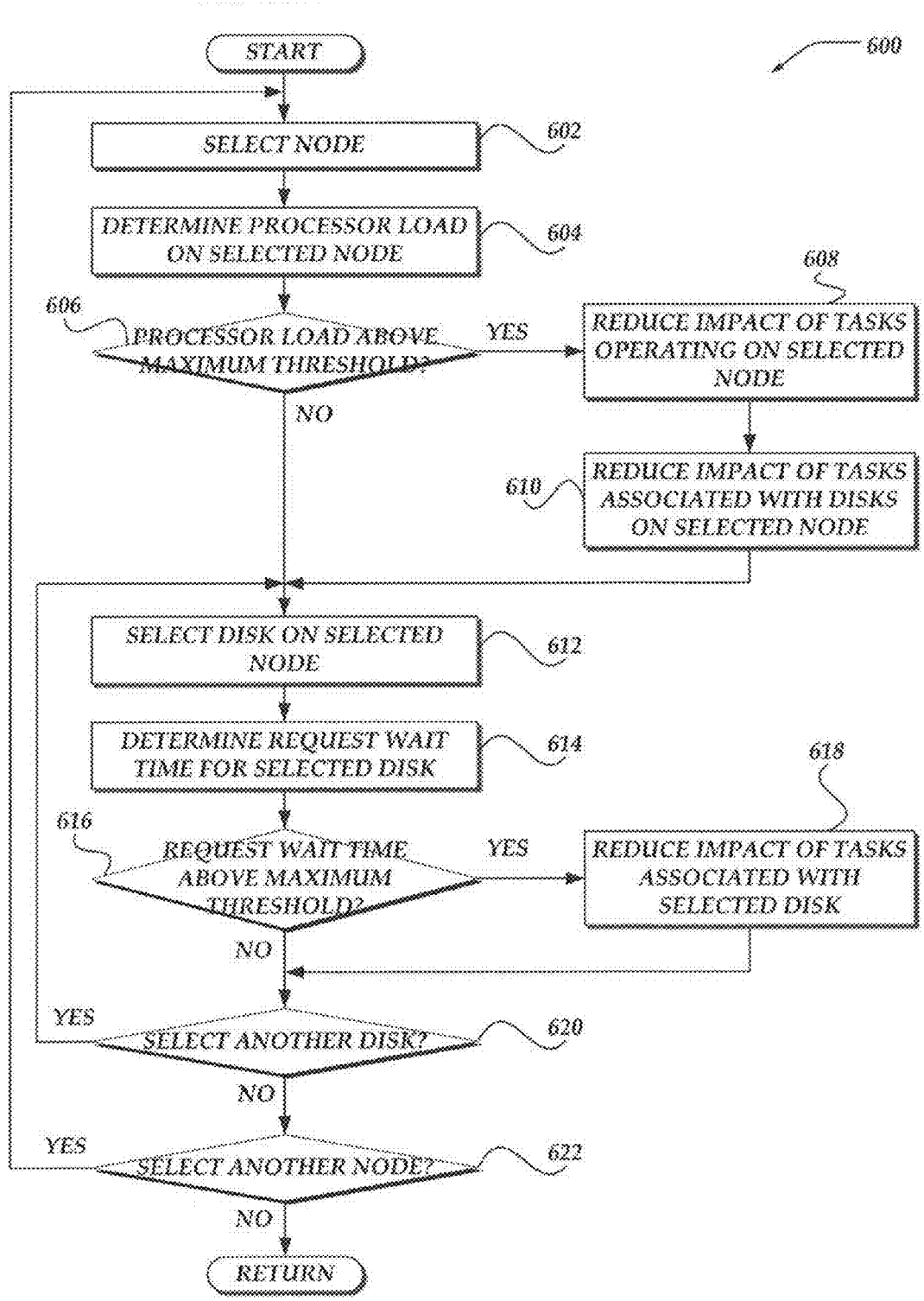
FIG. 6 illustrates a logical flow diagram generally showing one embodiment of a process for determining a processor workload and a disk workload to reduce an impact of tasks operating on one or more nodes.
Figure 7:
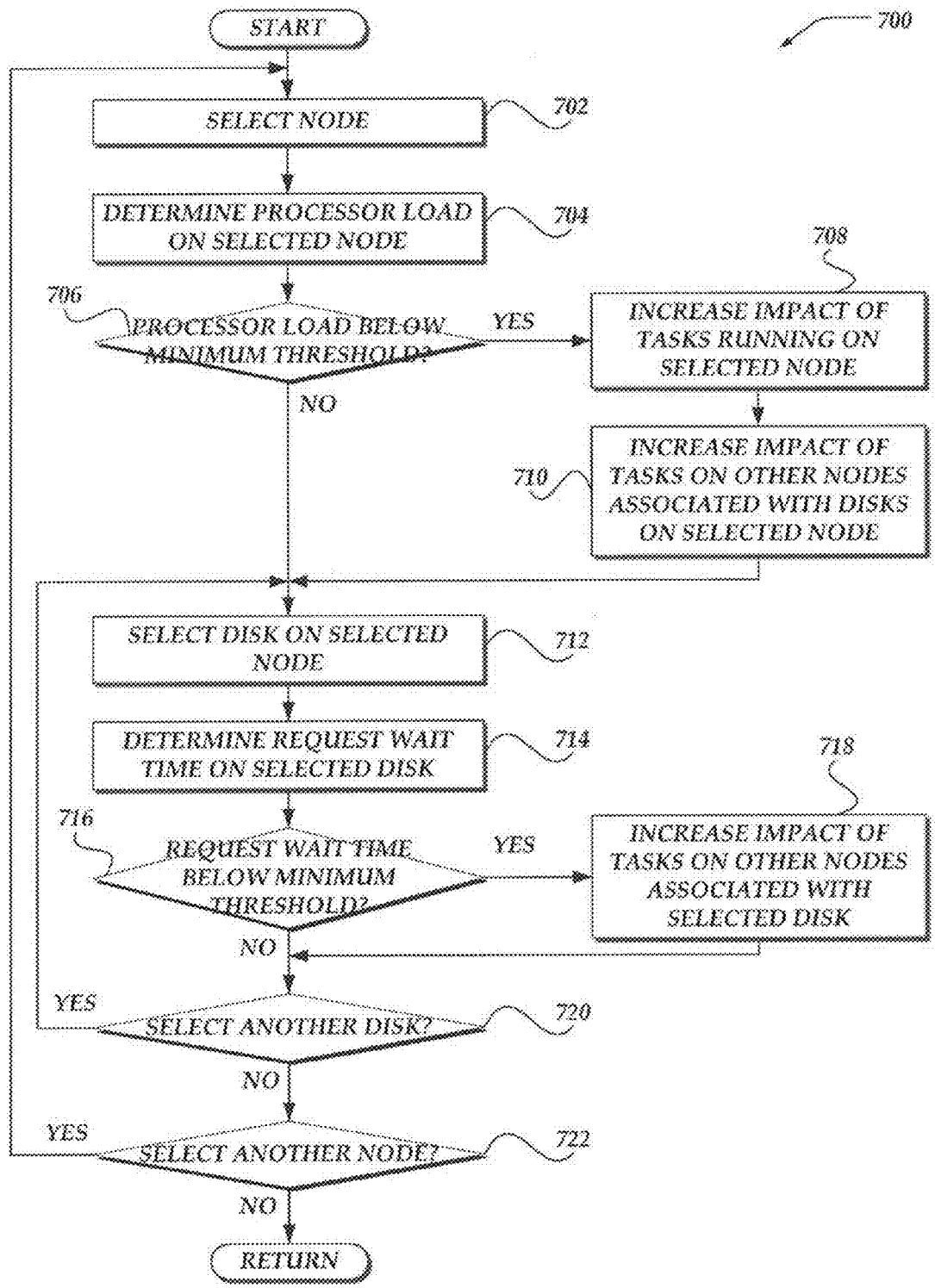
FIG. 7 illustrates a logical flow diagram generally showing one embodiment of a process for determining a processor workload and a disk workload to increase an impact of tasks operating on one or more nodes.

FIGS. 6 and 7 illustrate logical flow diagrams generally showing embodiments of processes for determining a processor workload and a disk workload to modify an impact of tasks operating on one or more nodes. In some embodiments, process 600 of FIG. 6 and process 700 of FIG. 7 may be performed separately or together by a coordinator as part of an impact analysis of a plurality of tasks distributed across a plurality of nodes. In one embodiment, if an impact of a task on a node is reduced during an impact analysis (e.g., at blocks 608, 610, or 618), then an impact of the same task on the same node may not be increased during the same impact analysis (e.g., at blocks 708, 710, or 718), but may be increased or further reduced during a subsequent impact analysis. Similarly, in another embodiment, if an impact of a task on a node is increased during an impact analysis (e.g., at blocks 708, 710, or 718), then an impact of the same task on the same node may not be reduced during the same impact analysis (e.g., at blocks 608, 610, or 618), but may be reduced or further increased during a subsequent impact analysis.

FIG. 6 illustrates a logical flow diagram generally showing one embodiment of a process for determining a processor workload and a disk workload to reduce an impact of tasks operating on one or more nodes. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at block 602, where a node among a plurality of nodes may be selected. In one embodiment, a coordinator node may randomly select an initial node. In other embodiments, the coordinator node may select a predetermined initial node. In yet other embodiments, the selected node may be based on other node specific conditions, such as, but not limited to, if the node is a participant node.

Process 600 continues at block 604, where a processor load of the selected node may be determined. In various embodiments, the processor load may be determined based on prior CPU activities and/or may be based on a prediction and/or anticipation of future CPU activities. In some embodiments, the processor load may be based on all tasks executing on the selected node. In other embodiments, the processor load may be based on a subset of all tasks executing on the selected node, such as system and/or maintenance tasks. In one embodiment, the processor load may be determined based on an amount of time a processor is executing instructions (i.e., CPU utilization). In another embodiment, the processor load may be determined based on a ratio and/or percentage of a time the processor is executing instructions compared to a time the processor is waiting for input/output operations. However, the invention is not so limited and other methods of determining a processor load may be employed.

Process 600 proceeds to decision block 606, where a determination may be made whether the processor load is above a maximum threshold. In one embodiment, the maximum threshold may be a predefined amount of CPU time in a given time interval. In some embodiments, the processor load may be compared to the maximum threshold to determine if the processor load is above the maximum threshold. If the processor load is above the maximum threshold, then processing flows to block 608; otherwise, processing flows to block 612.

At block 608, an impact of tasks operating on the selected node may be reduced. In one embodiment, the coordinator node may notify the selected node to reduce an impact of the tasks operating on the selected node. In at least one of the various embodiments, block 608 may employ embodiments of block 408 of FIG. 4 to reduce an impact of a tasks operating on the selected node, such as, for example, reducing a number of threads executing on the selected node for the task. In some embodiments, if an impact of a task on the selected node is reduced at block 610 or block 618, then an impact of the same task on the selected node may not be reduced at block 608.

Process 600 then flows to block 610, which is described in more detail below in conjunction with FIG. 8. Briefly, however, at block 610 an impact of tasks associated with disks on the selected node may be reduced. In one embodiment, the coordinator node may notify initiator nodes of the tasks associated with the disks on the selected node to reduce an impact of the tasks on the initiator nodes. In at least one of various embodiments, if an impact of a task on a node is reduced at block 608 or block 618, then an impact of the same task on the same node may not be reduced at block 610. Process 600 then flows to block 612.

At block 612, a disk on the selected node may be selected. In one embodiment, an initial disk on the selected node may be selected randomly, based on a predefined order, or the like.

Processing then flows to block 614, where a request wait time may be determined for the selected disk. In some embodiments, the request wait time may be based on a wait time of prior requests and/or may be based on a prediction and/or anticipation of wait time for future requests. In one embodiment, the request wait time may be an average time, a maximum time, minimum time, mode time, and/or median time, a request waits in a queue before being processed by the selected disk.

Process 600 continues at decision block 616, where a determination may be made whether the determined request wait time is above a maximum threshold. In some embodiments, the request wait time may be compared to the maximum threshold to determine if the request wait time is above the maximum threshold. If the request wait time is above the maximum threshold, then processing may flow to block 618, otherwise, processing may flow to decision block 620.

In some other embodiments, if the request wait time is above the maximum threshold, then a determination may be made whether a total number of operations for a given period of time for the selected disk is above a predefined maximum threshold. If the total number of operations is above the predefined maximum threshold, then processing may flow to block 618; otherwise, processing may flow to block 620.

At block 618 an impact of tasks associated with the selected disk (i.e., a hot disk) may be reduced, which is described in more detail below in conjunction with FIG. 8. In one embodiment, the coordinator node may notify initiator nodes of the tasks associated with the selected disk to reduce an impact of the tasks on the initiator node. In at least one of various embodiments, if an impact of a task on a node is reduced at block 608 or block 610, then an impact of the same task on the same node may not be reduced at block 618.

Processing then flows to decision block 620, where a determination may be made whether to select another disk on the selected node or not. In one embodiment, each disk on the selected node may be selected at least once. If another disk is to be selected, processing loops to block 612 to select another disk on the selected node; otherwise, processing flows to decision block 622.

At decision block 622, a determination may be made whether to select another node or not. In some embodiments, each node within a cluster of nodes may be selected at least once. If another node is to be selected, then processing loops to block 602 to select another node; otherwise, processing returns to a calling process to perform other actions.

FIG. 7 illustrates a logical flow diagram generally showing one embodiment of a process for determining a processor workload and a disk workload to increase an impact of tasks operating on one or more nodes. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 702, where a node among a plurality of nodes may be selected. In at least one of the various embodiments, block 702 may employ embodiments of block 602 of FIG. 6 to select a node.

Process 700 continues at block 704, where a processor load of the selected node may be determined. In at least one of the various embodiments, block 704 may employ embodiments of block 604 of FIG. 6 to determine the processor load of the selected node.

Process 700 proceeds to decision block 706, where a determination may be made whether the processor load is below a minimum threshold. In one embodiment, the minimum threshold may be a predefined amount of CPU time in a given time interval. In some embodiments, the processor load may be compared to the minimum threshold to determine if the processor load is below the minimum threshold. If the processor load is below the minimum threshold, then processing flows to block 708; otherwise, processing flows to block 712.

At block 708, an impact of tasks operating on the selected node may be increased. In one embodiment, the coordinator node may notify the selected node to increase an impact of the tasks operating on the selected node. In at least one of the various embodiments, block 708 may employ embodiments of block 408 of FIG. 4 to increase an impact of a tasks operating on the selected node, such as, for example, increasing a number of threads executing on the selected node for the task. In some embodiments, if an impact of a task on the selected node is increased at block 710 or block 718, then an impact of the same task on the selected node may not be increased at block 708.

Process 700 then flows to block 710, which is described in more detail below in conjunction with FIG. 8. Briefly, however, at block 710 an impact of tasks associated with disks on the selected node may be increased. In one embodiment, the coordinator node may notify initiator nodes of the tasks associated with the disks on the selected node to increase an impact of the tasks on the initiator nodes. In at least one of various embodiments, if an impact of a task on a node is increased at block 708 or block 718, then an impact of the same task on the same node may not be increased at block 710. Process 700 then flows to block 712.

At block 712, a disk on the selected node may be selected. In at least one of the various embodiments, block 712 may employ embodiments of block 612 of FIG. 6 to select a disk.

Processing then flows to block 714, where a request wait time may be determined for the selected disk. In at least one of the various embodiments, block 714 may employ embodiments of block 614 of FIG. 6 to determine a request wait time of the selected disk.

Process 700 continues at decision block 716, where a determination may be made whether the determined request wait time is below a minimum threshold. In some embodiments, the request wait time may be compared to the minimum threshold to determine if the request wait time is below the minimum threshold. If the request wait time is below the minimum threshold, then processing may flow to block 718, otherwise, processing may flow to decision block 720.

In some other embodiments, if the request wait time is below the minimum threshold, then a determination may be made whether a total number of operations for a given period of time for the selected disk is below a predefined minimum threshold. If the total number of operations is below the predefined minimum threshold, then processing may flow to block 718; otherwise, processing may flow to block 720.

At block 718 an impact of tasks associated with the selected disk (i.e., a cold disk) may be increased, which is described in more detail below in conjunction with FIG. 8. In one embodiment, the coordinator node may notify initiator nodes of the tasks associated with the selected disk to increase an impact of the tasks on the initiator node. In at least one of various embodiments, if an impact of a task on a node is increased at block 708 or block 710, then an impact of the same task on the same node may not be increased at block 718.

Processing then flows to decision block 720, where a determination may be made whether to select another disk on the selected node or not. In at least one of the various embodiments, block 720 may employ embodiments of block 620 of FIG. 6 to determine whether to select another disk or not. If another disk is to be selected, processing loops to block 712 to select another disk on the selected node; otherwise, processing flows to decision block 722.

At decision block 722, a determination may be made whether to select another node or not. In at least one of the various embodiments, block 722 may employ embodiments of block 622 of FIG. 6 to determine whether to select another node or not. If another node is to be selected, then processing loops to block 702 to select another node; otherwise, processing returns to a calling process to perform other actions.

Figure 8:
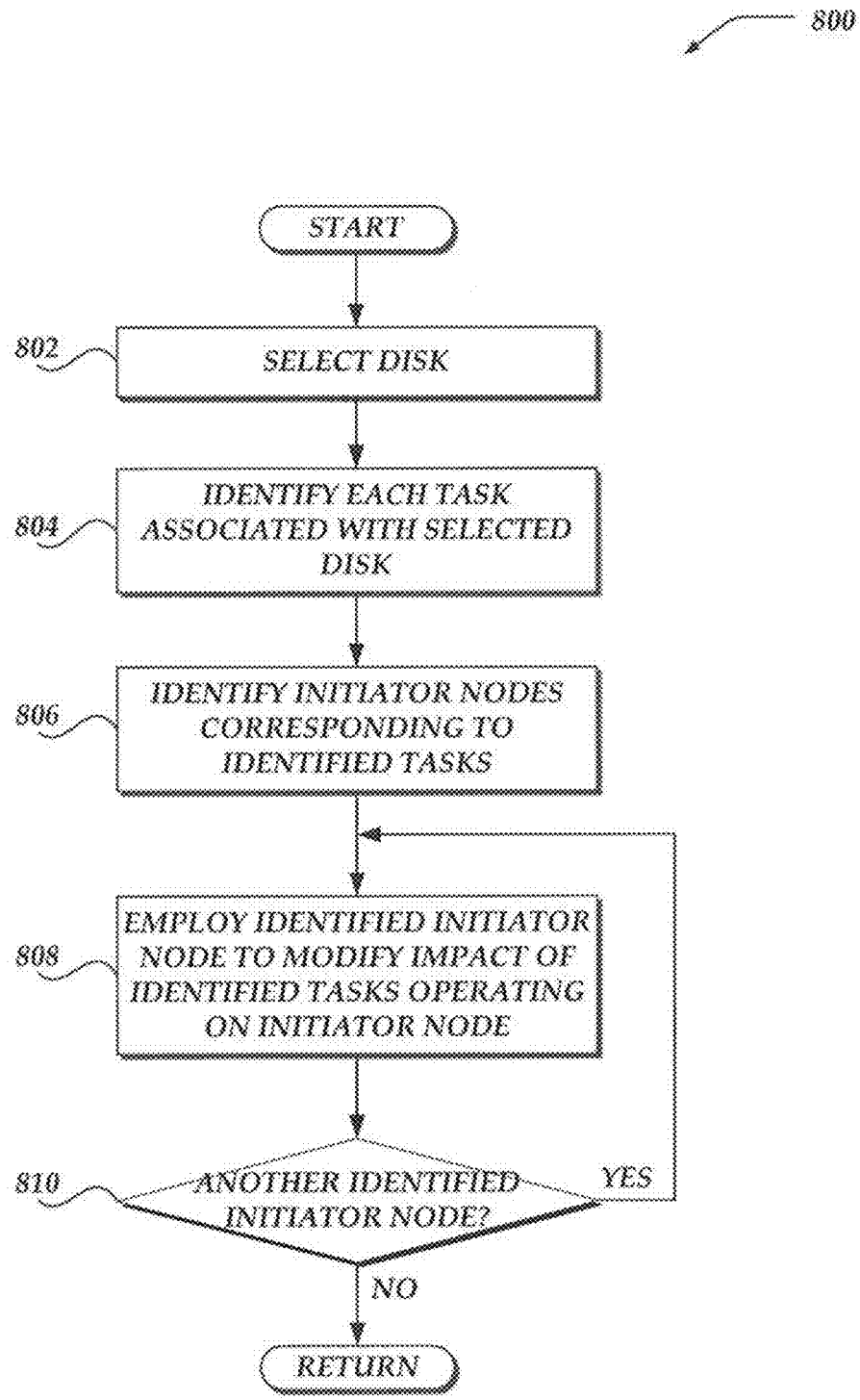
FIG. 8 illustrates a logical flow diagram generally showing one embodiment of a process for identifying and employing initiator nodes to modify an impact of tasks operating on the initiator nodes.

FIG. 8 illustrates a logical flow diagram generally showing one embodiment of a process for identifying and employing initiator nodes to modify an impact of tasks operating on the initiator nodes. In some embodiments, process 800 of FIG. 8 may be implemented by and/or executed on a single network device, such as network device 300 of FIG. 3. In other embodiments, process 800 or portions of process 800 of FIG. 8 may be implemented by and/or executed on a plurality of network devices, such as network device 300 of FIG. 3.

Process 800 begins, after a start block, at block 802, where a disk is selected. In one embodiment, a coordinator node may select a disk on a participant node. In some embodiments, the disk may be selected by block 612 of FIG. 6 and/or block 712 of FIG. 7. In at least one of the various embodiments, block 802 may employ embodiments of block 612 of FIG. 6 to select a disk.

Process 800 continues at block 804, where each task associated with the selected disk is identified. In some embodiments, a coordinator node may identify each task based on a tag that corresponds to requests provided to the selected disk. As described above, a node (i.e., participant node) associated with the selected disk may collect and/or store statistical data about the selected disk, which may, in one embodiment, be periodically provided to the coordinator node. In one embodiment, the statistical data may include a mapping between the selected disk and requests provided to the selected disk. Additionally, in some embodiments, each request may include a tag that uniquely identifies an initiator node and associated task that provided the request. Thus, in some embodiments, the coordinator node may utilize the statistical data collected and/or stored by a node to identify tasks associated with requests provided to the selected node.

Process 800 next proceeds to block 806, where initiator nodes corresponding to the identified tasks are identified. In some embodiments, a coordinator node may identify each initiator node based on a tag that corresponds to requests provided to the selected disk. As described above, in some embodiments, each request associated with the selected disk may include a tag that uniquely identifies an initiator node associated with an identified task that provided the request. Thus, in some embodiments, the coordinator node may utilize the statistical data collected and/or stored by a node to identify tasks associated with requests provided to the selected node.

Process 800 proceeds to block 808, where an identified initiator node may be employed to dynamically modify an impact of identified tasks operating on its node. In one embodiment, the coordinator node may notify the identified initiator node to modify identified tasks operating on the identified initiator node. In at least one of various embodiments, block 808 may employ embodiments of block 408 of FIG. 4 to dynamically modify an impact of an identified task operating on an identified initiator node.

For example, in some embodiments, the impact of an identified task may be reduced on an identified initiator node, such as at blocks 610 and/or block 618 of FIG. 6, by reducing a number of threads executing on the indentified initiator node for the identified task. In one embodiment, the identified initiator node may terminate or sleep a thread that provided a request to the selected disk based on the request tag.

In other embodiments, the impact of an identified task may be increased on an identified initiator node, such as at block 710 and/or 718 of FIG. 7, by increasing a number of threads executing on the indentified initiator node for the identified task.

In any event, process 800 then proceeds to decision block 810, where a determination may be made whether there is another identified initiator node. In some embodiments, each initiator node identified at block 806 may be employed to modify an impact of identified tasks at block 808. If there is another identified initiator node, then processing loops to block 808 to perform additional actions; otherwise, processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations

Figure 9A:
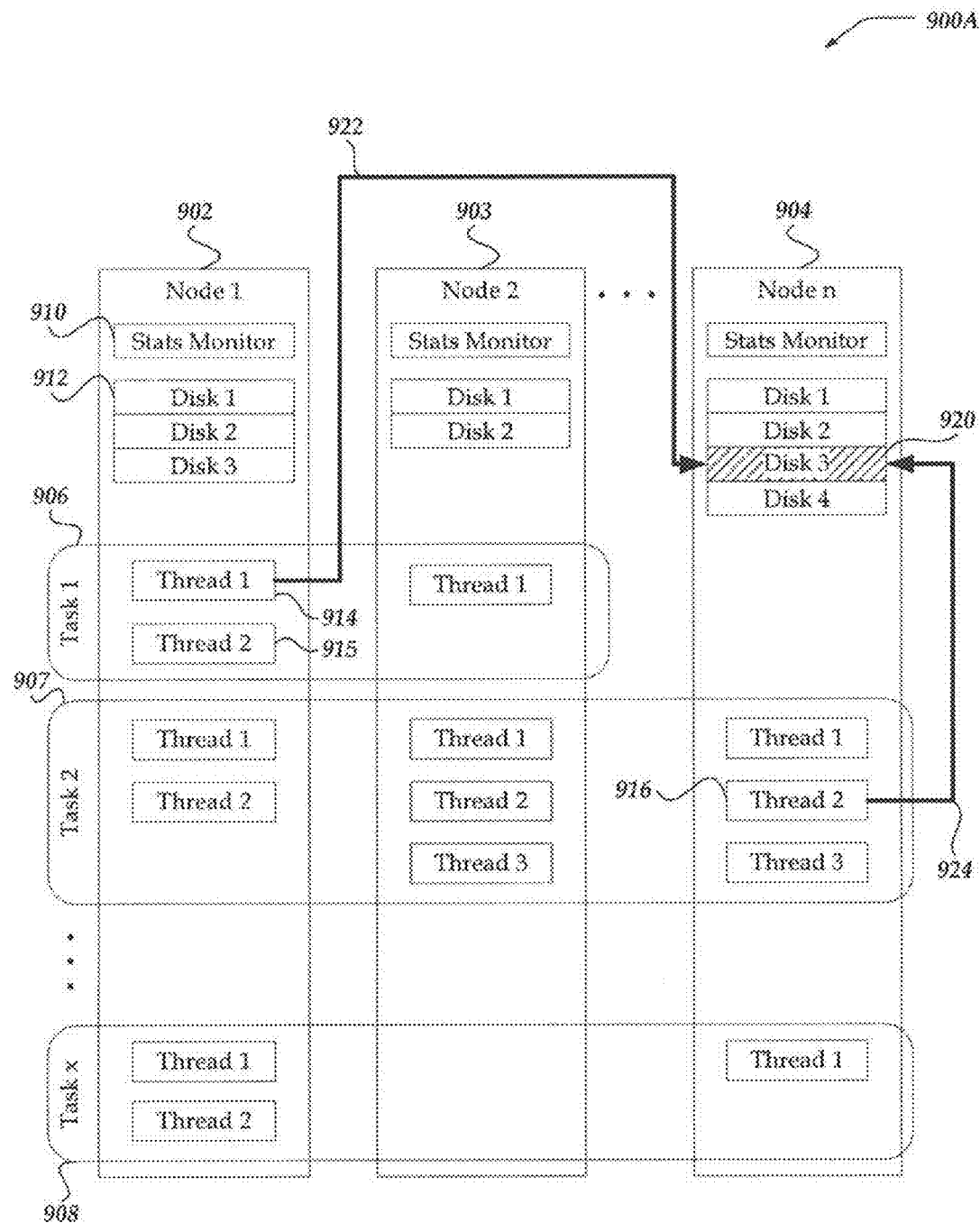
FIGS. 9A and 9B show an embodiment of a use case illustration of a plurality of tasks distributed across a cluster of nodes, where an impact of respective tasks operating on initiator nodes that provided requests to a disk on a participant node with a workload above a threshold.
Figure 9B:
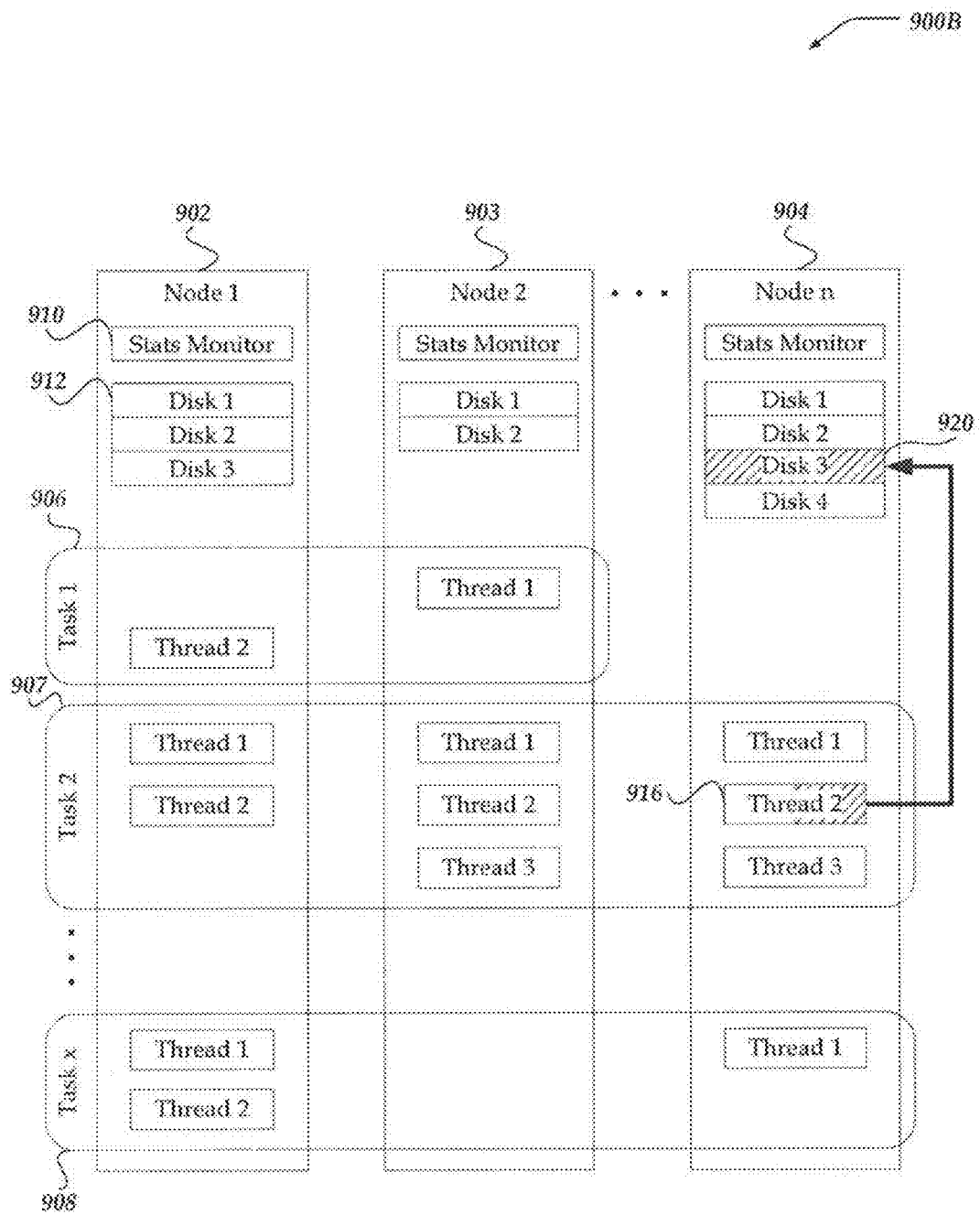

FIGS. 9A and 9B show an embodiment of a use case illustration of a plurality of tasks distributed across a cluster of nodes, where an impact of respective tasks operating on initiator nodes that provided requests to a disk on a participant node with a workload above a threshold.

Systems 900A and 900B may include nodes 902-904. Although not shown, one of nodes 902-904 may be a coordinator node. Nodes 902-904 may each include a stats monitor (e.g., stats monitor 910) and a plurality of disks. Each stats monitor may collect and/or store statistical data for a given node. For example, stats monitor 910 may collect and/or store statistical data for node 902. Statistical data may include a total number of read operations, a total number of write operations, a total number of read bytes, a total number of written bytes, a wait time of requests in queue, or the like, for each disk on a respective node. In some embodiments, the stats monitor may include a mapping between a request, an initiator node that provided the request, a task associated with the request, a disk that received the request, and the corresponding statistical data of the request, and the like.

Nodes 902-904 may each include a different plurality of physical disks. In some embodiments, the number of disks on each node may be symmetrical or asymmetrical. For example, as shown node 902 includes three disks, node 903 includes two disks, and node 904 includes four disks. Although nodes 902-904 each include a disk labeled "Disk 1," each disk may be a separate physical disk. In some other embodiments, two or more nodes may share one or more disks (not shown). However, the invention is not so limiting and each node may include a different number of disks, arrangement of disks, or the like.

System 900A may be snapshot of a system after implementing embodiments of blocks 402 and 404 of FIG. 4. For example, as shown, a plurality of tasks may be distributed across nodes 902-904. For example, a portion of tasks 906-908 may be operating on nodes 902-903, while a portion of tasks 907-908 may be operating on node 904. As described above, tasks may operate on a single node and/or may be distributed across a plurality of nodes. Each task may include one or more threads executing on a given node. For example, threads 914-915 are executing on node 902 for task 906.

Furthermore, system 900A illustrates requests 922 and 924. For request 922, node 902 may be an initiator node and node 904 may be a participant node (i.e., node 902 may provide request 922 to disk 920 on node 904). And for request 924, node 904 may be an initiator node and a participant node (i.e., node 904 may provide request 924 to disk 920 on node 904).

By employing embodiments described above, such as blocks 406 and 408 of FIG. 4, disk 920 may be determined to have a workload above a minimum threshold (i.e., a hot disk). Further, node 902 may be identified to reduce an impact of task 906 operating on node 902 because thread 914 initiated request 922 to disk 920. Similarly, node 904 may be identified to reduce an impact of task 907 operating on node 904 because thread 916 initiated request 924 to disk 920. One embodiment illustrating a result of reducing an impact of respective tasks on initiator nodes that provided requests to disk 920 is shown in FIG. 9B.

System 900B may be snapshot of a system after implementing embodiments of block 408 of FIG. 4. Node 902 may reduce an impact of task 906 operating on node 902. In some embodiments, as shown, node 902 may terminate thread 914 of FIG. 9A. In other embodiments, thread 914 may not be terminated (not shown), but may be put to sleep such that it is in a wait mode. In one such embodiment, thread 914 may wait a predetermined time before continuing to execute. In another such embodiment, thread 914 may wait and continue to execute if node 902 increases an impact of task 906 operating on node 902. In yet other embodiments, another thread operating on node 902 for task 906, such as, for example, thread 915 of FIG. 9A, may be terminated, put to sleep, or the like (not shown), rather than thread 914 of FIG. 9A (i.e., the thread that provided the request to disk 920).

Similarly, node 904 may reduce an impact of task 907 operating on node 904. In some embodiments, as shown, node 904 may fractionally reduce thread 916, such as, for example, by one half. However, other numbers of threads may be reduced in accordance with embodiments as described above.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing the processing of tasks over a network, comprising:
   receiving at least one task and assigning the at least one task to a coordinator node among a plurality of nodes wherein nodes of the plurality of nodes are distinct computing devices arranged in a cluster interconnected by a backplane;
   provisioning by the coordinator node at least one thread for the at least one task for processing on at least one of the plurality of nodes, wherein a node that is provisioned at least one thread is deemed an initiator node associated with the thread;
   employing the initiator node to process the at least one task using the provisioned at least one thread, wherein processing the at least one task includes making at least one storage drive access request to at least another of the plurality of nodes that is separately employed as a participant node that provides access to at least one storage drive device;
   determining by the coordinator node each storage drive device at each participant node having a workload processing access requests that is above a predefined threshold; and
   dynamically reducing at least a portion of the at least one thread on the initiator node that provided the storage drive access request to each participant node that provides access to the at least one storage device having the workload above the predefined threshold.

2. The method of claim 1, wherein the storage drive access request includes a tag that identifies at least the initiator node and the task.

3. The method of claim 1, wherein the workload is based at least in part on an amount of time that the storage drive access request waits until it is processed by a storage drive device.

4. The method of claim 1, wherein the workload is based at least in part on a number of operations processed by a storage drive device.

5. The method of claim 1, wherein the workload is based at least in part on processor utilization of each participant node.

6. The method of claim 1, further comprising:
   determining each storage drive device at each participant node having a workload processing access requests that is below a predefined threshold; and
   dynamically increasing a number of threads for the at least one received task processing on the initiator node that provided the storage drive access request to each participant node that provides access to the at least one storage device having the workload below the predefined threshold.

7. A network device for managing the processing of tasks over a network, comprising:
a memory for storing data and instructions;
a processor that executes the instructions to enable actions, including:
receiving at least one task and assigning the at least one task to a coordinator node among a plurality of nodes wherein nodes of the plurality of nodes are distinct computing devices arranged in a cluster interconnected by a backplane;
provisioning by the coordinator node at least one thread for the at least one task for processing on at least one of the plurality of nodes, wherein a node that is provisioned at least one thread is deemed an initiator node associated with the thread;
employing the initiator node to process the at least one task using the provisioned at least one thread, wherein processing the at least one task includes making at least one storage drive access request to at least another of the plurality of nodes that is separately employed as a participant node that provides access to at least one storage drive device;
determining by the coordinator node each storage drive device at each participant node having a workload processing access requests that is above a predefined threshold; and
dynamically reducing at least a portion of the at least one thread on the initiator node that provided the storage drive access request to each participant node that provides access to the at least one storage device having the workload above the predefined threshold.

8. The network device of claim 7, wherein the storage drive access request includes a tag that identifies at least the initiator node and the task.

9. The network device of claim 7, wherein the workload is based at least in part on an amount of time that the storage drive access request waits until it is processed by a storage drive device.

10. The network device of claim 7, wherein the workload is based at least in part on at least one of an amount of time a storage drive device takes to complete the storage drive access request and an amount of time a storage drive device is expected to take to complete the storage drive access request.

11. The network device of claim 7, wherein the workload is based at least in part on a number of operations processed by a storage drive device.

12. The network device of claim 7, wherein the workload is based at least in pml on processor utilization of each participant node.

13. The network device of claim 7, wherein the processor further enable actions, comprising:
determining each storage drive device at each participant node having a workload processing access requests that is below a predefined threshold; and
dynamically increasing a number of threads for the at least one received task processing on the initiator node that provided the storage drive access request to each participant node that provides access to the at least one storage device having the workload below the predefined threshold.

14. A processor readable non-transitory storage media that includes instructions for managing the processing of tasks with a network device, wherein the execution of the instructions by a processor enables actions, comprising:
receiving at least one task and assigning the at least one task to a coordinator node among a plurality of nodes wherein nodes of the plurality of nodes are distinct computing devices arranged in a cluster interconnected by a backplane;
provisioning by the coordinator node at least one thread for the at least one task for processing on at least one of the plurality of nodes, wherein a node that is provisioned at least one thread is deemed an initiator node associated with the thread;
employing the initiator node to process the at least one task using the provisioned at least one thread, wherein processing the at least one task includes making at least one storage drive access request to at least another of the plurality of nodes that is separately employed as a participant node that provides access to at least one storage drive device;
determining by the coordinator node each storage drive device at each participant node having a workload processing access requests that is above a predefined threshold; and
dynamically reducing at least a portion of the at least one thread on the initiator node that provided the storage drive access request to each participant node that provides access to the at least one storage device having the workload above the predefined threshold.

15. The media of claim 14, wherein the storage drive access request includes a tag that identifies at least the initiator node and the task.

16. The media of claim 14, wherein the workload is based at least in part on an amount of time that the storage drive access request waits until it is processed by a storage drive device.

17. The media of claim 14, wherein the workload is based at least in part on at least one of an amount of time a storage drive device takes to complete the storage drive access request and an amount of time a storage drive device is expected to take to complete the storage drive access request.

18. The media of claim 14, wherein the workload is based at least in part on a number of operations processed by a storage drive device.

19. The media of claim 14, wherein the workload is based at least in part on processor utilization of each participant node.

20. The media of claim 14, further comprising:
determining each storage drive device at each participant node having a workload processing access requests that is below a predefined threshold; and
dynamically increasing a number of threads for the at least one received task processing on the initiator node that provided the storage drive access request to each participant node that provides access to the at least one storage device having the workload below the predefined threshold.

* * * * *